E. C. HEYN.

GARMENT.

APPLICATION FILED JULY 10, 1915.

Reissued Sept. 21, 1915.

13,983.

WITNESSES

George DuBois

John A. Schlenbert

INVENTOR

EDMUND C. HEYN

BY

Bicknell & Knauth

ATTORNEYS

COLUMBIA PLANOGRAPH CO., WASHINGTON, D. C.

UNITED STATES PATENT OFFICE.

EDMUND C. HEYN, OF CATONSVILLE, MARYLAND, ASSIGNOR TO THE B. V. D. COMPANY, OF NEW YORK, N. Y., A CORPORATION OF DELAWARE.

GARMENT.

13,983. Specification of Reissued Letters Patent. Reissued Sept. 21, 1915.

Original No. 1,113,992, dated October 20, 1914, Serial No. 796,871. Application for reissue filed July 10, 1915. Serial No. 39,194.

*To all whom it may concern:*

Be it known that I, EDMUND C. HEYN, a citizen of the United States, and resident of Catonsville, county of Baltimore, State of Maryland, have invented a certain new and useful Improvement in Garments, of which the following is a specification.

The invention relates generally to an improvement in undergarments, and more particularly to a means whereby the usual undershirt and drawers are adapted for a convenient and ready connection to provide for the proper support of the drawers from the undershirt.

The main object of the present invention is the provision of complementary means on the undershirt and drawers whereby they may be readily and conveniently connected to properly support the drawers from the undershirt, the connecting means being constructed to permit of adjustable connection, and arranged to permit the undershirt to be worn inside or outside of the drawers in accordance with the inclination of the wearer.

The invention in the preferred form of details will be described in the following specification, reference being had particularly to the accompanying drawings, in which:—

Figure 1:
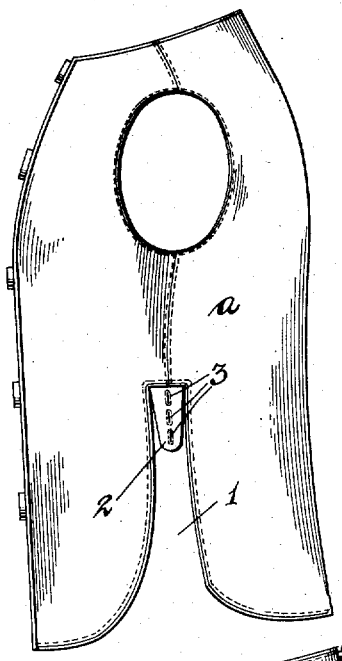
Figure 2:
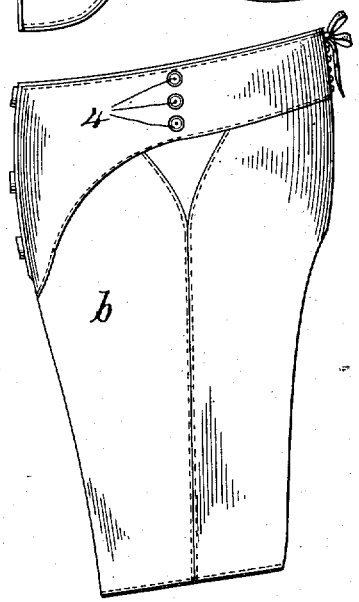

Figure 1 is a view in elevation showing an ordinary type of undershirt provided with the fastening means of my improvement. Fig. 2 is a similar view of the drawers, showing the complementary fastening means.

In the drawings, the undershirt and drawers, indicated respectively by *a* and *b*, are intended to represent any conventional type or form of these garments, as the invention is readily operable to any type of upper and lower garments designed to be worn in such position that the lower garment may be supported from the upper garment. Therefore, while illustrating and describing the invention as more particularly operable to undergarments, it is to be understood that by the term "undergarments" I mean any upper and lower garments adapted to be worn in a manner to permit their connection by means of the present improvement.

In carrying out the present improvement, and as a particularly important and salient feature thereof, I form in the opposing side sections of the upper garment or undershirt longitudinally extending slits 1, preferably of appreciable width, which may, as shown, extend through to the bottom edge of said garment. The upper margin of the slit thus formed, terminates, in the particular garment illustrated, approximately on the line reached by the upper edge of the lower garment when the latter is in its uppermost position on the body of the wearer. In the illustrated example of my invention a tab 2 is secured to the upper marginal edge of each slit 1 and is connected at its upper edge only to the garment so as to depend within the slit, as shown. The tab, which may be of any appropriate material having the requisite strength, may be formed with a series of button holes 3, preferably arranged in a longitudinal row.

The drawers *b* in the illustrated example are formed or provided on opposing sides, preferably throughout that portion coinciding with the tab area when the garments are in wearing position, with buttons 4, of a size to coöperate with the button holes 3. In the present instance the buttons are shown as secured to the usual reinforce section, but it is of course apparent that they may with equal efficiency be secured in any desired manner, so long as the requisite strength is obtained.

In the use of the garments with the improved connecting means, as illustrated, the lower garment is connected to the upper garment by buttoning the tab 2 to one or more of the buttons 4, the longitudinal arrangement of the buttons and button holes permitting a range of connection to compensate for variations in the length of the garments and their set, for the convenience of the wearer.

The slits or cut out portions 1 in combination with the coöperating fastening means are the particularly important features of the improvement, as by the arrangement described it is obvious that the garments may be connected, through the connecting means described, with the lower portion of the upper garment inside or outside of the lower garment. The inclination and desires of the wearer are thus conveniently provided for, and the connection between the garments, that is the proper support of the lower garment, is equally effective and as readily operated in either position of the upper garment.

While showing the button holes in the tabs and the buttons on the lower garment, it is of course obvious that the connecting means may be reversed with equal efficiency so that the button holed tab is carried by the lower garment while the buttons are on the upper garment, and obviously also the arrangement of button holes provided in the lower garment and buttons on the tabs may be reversed. Furthermore, the buttons and button holes are designed to conventionally illustrate any acceptable or appropriate type of complementary fastening means.

What is claimed is:

1. A connecting means for upper and lower garments, comprising a tab connecting the two garments together, said tab when the garments are connected, overlapping the upper part of the space afforded by a longitudinal slit formed in said upper garment, means for securing one end of the tab to one of said two garments, fastening means carried by said tab and complementary fastening means on the adjacent garment in that portion registering with the tab when the garments are in wearing position.

2. An upper garment formed with opposing longitudinally extending slits, fastening means permanently located near the upper marginal end of the slits, and complementary fastening means carried by the lower garment in those portions registering with the tabs when the garments are in wearing position, one of said two coöperating fastening means being carried by tabs attached to one of said garments.

3. An undershirt formed with opposing longitudinally extending slits opening through the lower edge of the garment, tabs secured to the garment at the upper marginal end of the slits, a series of button holes formed longitudinally of the tabs, and drawers provided with a longitudinal series of buttons on those portions of the drawers registering with the tabs when the garments are in wearing positions.

In testimony whereof I have hereunto set my hand in the presence of two subscribing witnesses.

EDMUND C. HEYN.

Witnesses:
H. D. STONESTREET,
ALBERT E. HUETER.

Copies of this patent may be obtained for five cents each, by addressing the "Commissioner of Patents, Washington, D. C."